350-266.
7-17-73    OR    3,746,429    SR

United States Patent [19]
Spindel et al.

[11] 3,746,429
[45] July 17, 1973

[54] LINEAR VARIABLE LIGHT ATTENUATOR

[75] Inventors: Abraham Spindel, Los Angeles; James F. Maas, Simi, both of Calif.

[73] Assignee: Recognition Systems, Inc., Van Nuys, Calif.

[22] Filed: Aug. 5, 1971

[21] Appl. No.: 169,202

[52] U.S. Cl. .................................. 350/266, 356/235
[51] Int. Cl. ............................................. G02b 5/00
[58] Field of Search.................... 350/266; 356/235; 250/233

[56] References Cited
UNITED STATES PATENTS 3,322,026   5/1967   Rigrod .......................... 350/266 X
2,806,405   9/1957   Amand .......................... 250/233 X

*Primary Examiner*—Ronald L. Wibert
*Assistant Examiner*—F. L. Evans
*Attorney*—Ralph B. Pastoriza and John E. Kelly

[57]            ABSTRACT

A compact variable light beam attenuator adapted for use in laser system. A pair of optical wedges having flat, parallel surfaces are movably mounted in a light beam path. The wedges are movable with respect to each other along a line having a component normal to the light beam path. The optical density of one wedge increases and that of the other wedge decreases in a given direction along the line of movement. The sum of the optical densities of the areas of the wedges in the light beam path is the effective density of the attenuator.

1 Claim, 4 Drawing Figures

PATENTED JUL 17 1973
3,746,429
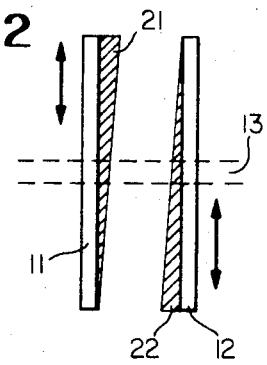
Fig. 2
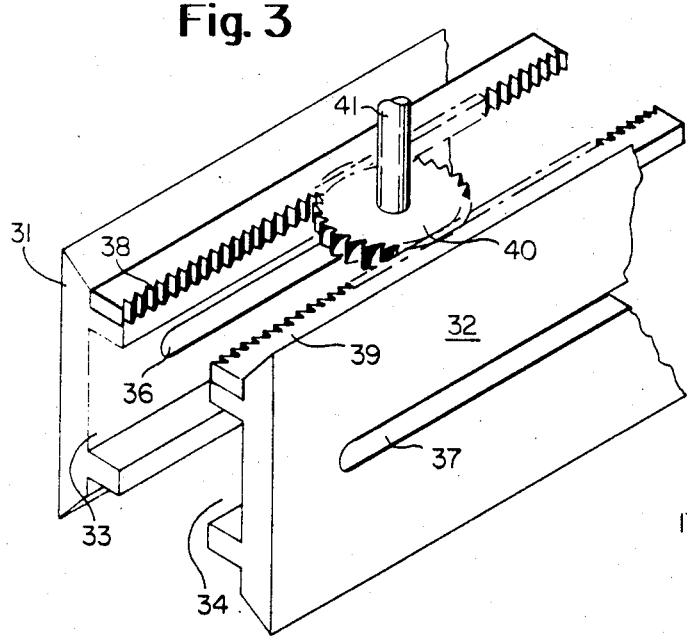
Fig. 3
Fig. 1
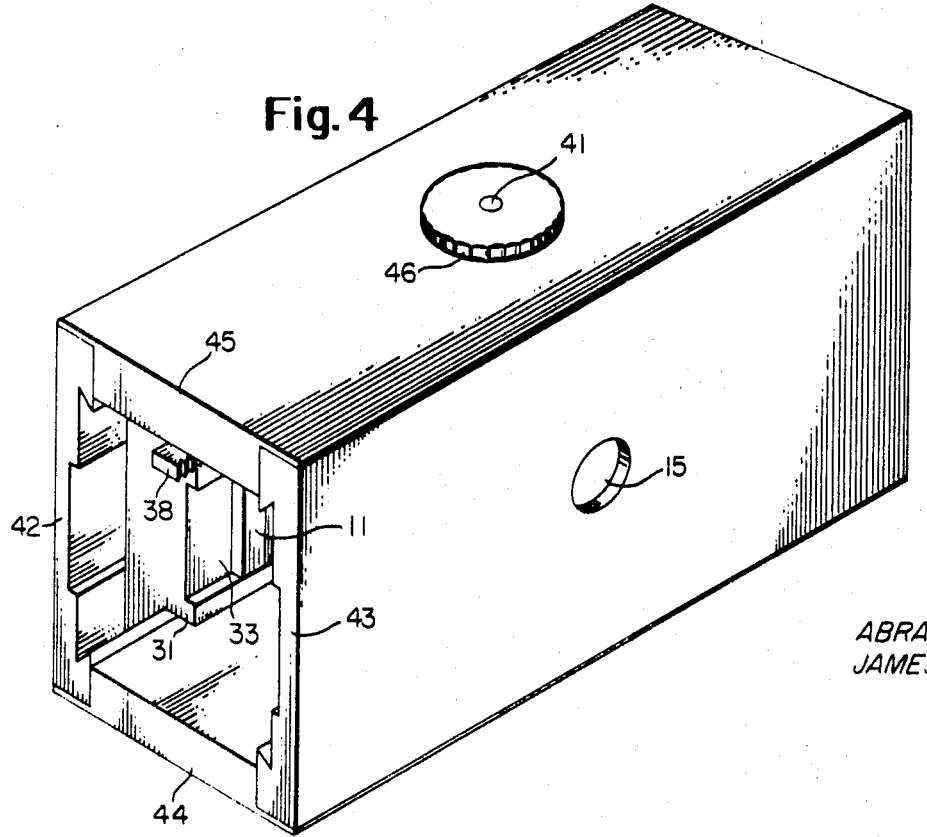
Fig. 4
ABRAHAM SPINDEL
JAMES F. MAAS
INVENTORS

LINEAR VARIABLE LIGHT ATTENUATOR

In systems employing lasers as high intensity coherent light beam sources, it is frequently desirable to provide a variable light beam attenuator to control the intensity of the beam without appreciably affecting its other properties. Variable apertures or irises frequently used to regulate the intensity of incoherent light beams, can, in principle, be used to regulate the cross-section of a coherent beam and hence its total energy content. However, an aperture does not, apart from diffraction effects, change the intensity of the beam portion which passes through it. In many systems the diffraction of the coherent beam at an aperture is an undesirable effect.

Perhaps the principal alternative to the use of apertures or irises as light beam regulators is the use of optical density filters. Variable optical density has been provided in the past by employing movable optical wedges or density filters in which optical density is a varying function of position over the area of the filter. Thus, a single circular optical wedge has been used in which optical density is a function of the angle of rotation. Although circular wedges provide a longer span over which to extend the transition from zero to full transmission than does a linear wedge of a length similar to the diameter of the circular wedge, a wedge with a given length of scale may still be inconveniently large. Optical plates of the quality required in laser systems are costly and difficult to obtain in larger sizes.

A single optical wedge of reasonable size may introduce unwanted non-uniformities in a laser beam as a result of the variation in its optical density over the cross-section of the beam. Although this effect could be avoided by using wedges with optical densities varying in steps, there are many applications in which continuously variable attenuation is desired.

The present invention is intended to provide a compact variable attenuator which is well suited for use with high intensity light sources, such as lasers. In the preferred embodiment, the invention offers smoothly and continuously variable attenuation which is uniform over the cross-section of the light beam to be attenuated. As a result of this uniformity, the full range of optical density from zero to maximum attenuation can conveniently be compressed into wedges of relatively short length.

FIG. 1 depicts in schematic form a variable light beam attenuator embodying the invention;

FIG. 2 is a diagram illustrating certain features of the preferred embodiment of the invention;

FIG. 3 is a perspective view of a portion of a variable light beam attenuator according to the invention; and FIG. 4 is a perspective view of a device embodying the invention and employing the mechanism shown in FIG. 2.

There is shown in FIG. 1 a diagrammatic rendering of the invention, comprising a pair of optical wedges 11 and 12 positioned in a light beam path 13 defined by transparent openings 14 and 15 in opaque plates 16 and 17. Wedges 11 and 12 are movable with respect to each other along a direction having a component normal to beam path 13. In FIG. 1, the direction of movability is substantially normal to beam path 13, as indicated by the arrows.

Each of the wedges 11 and 12 comprises a transparent plate having optically flat parallel surfaces. The optical density of wedge 11 increases and that of wedge 12 decreases along a given direction along the line of movability of the wedges with respect to each otehr. Wedges 11 and 12 may be parallel to each other or, alternatively, may be inclined at a small angle, on the order of one degree, to each other so as to divert unwanted multiple or secondary reflections of the light beam occurring in the space between the wedges from the optical path.

The effective optical density of an attenuator embodying the invention is the sum of the optical densities of the areas of wedges 11 and 12 which are positioned in beam path 13. The effective density of the attenuator may be varied by moving one or both of the wedges to bring wedge areas of different densities into position in beam path 13. By moving wedges 11 and 12 in opposite directions along the line of movability, a relatively large density change may be produced, which is the sum of the density changes produced by the movement of the wedges individually.

Although wedges 11 and 12 may be provided with optical densities varying according to any desired function along the direction of movability, numerous applications of the invention will employ wedges having optical densities varying linearly from zero (100 percent transmission) to about 2.0 (1% transmission). A pair of such wedges enables the full useful range of attenuation to be produced in a relatively compact device.

Some of the more desirable characteristics of attenuators employing a pair of linear wedges may be determined by reference to FIG. 2, which depicts wedges 11 and 12 having optical densities represented as layers 21 and 22. Layer 21 of wedge 11 increases in thickness and optical density as a linear function of distance along the wedge in the direction from the bottom to the top of FIG. 2. Layer 22 of wedge 12 decreases as a linear function of distance along the wedge in the same direction. The effective thickness and optical density of the attenuator in the area of light beam path 13 is the sum of the thickness and optical densities of layers 21 and 22 in that area.

If the optical densities of the wedges vary according to similar linear functions, that is, functions which differ only in the sign of their slope or rate of change in a selected direction along the line of movability, it can be seen that the effective optical density of the attenuator will be the same over its entire area. Thus, beam path 13 may be moved with respect to wedges 11 and 12 without causing a change in the effective attenuation as long as its angle of incidence remains unchanged. A further advantage of a pair of linear wedges as described is that the optical density is uniform over beam path 13 so that the distribution of energy over the beam's cross-section is not affected by its passage through the attenuator.

Optical wedges 11 and 12 may be formed of optical quality quartz or "Vycor" plates with one surface of each coated with evaporated metal, such as nichrome. By way of example, linear variation of the thickness of the evaporated metal layer may be achieved by evaporating the metal from a source disposed at a low angle to the surface of the plates. Alternatively, the evaporated metal may be deposited through a slit in a shield which is moved over the plates at a properly programmed speed. Anti-reflection coatings may then be applied to the surfaces of the plates to minimize undesired reflections in the device.

The requisite shearing-type motion of the wedges with respect to each other may be achieved by mounting them in an arrangement such as that illustrated in FIG. 3. A slide or carrier 31, 32 is provided for each wedge. Slides 31, 32 have grooves or channels 33, 34 into which the wedges fit, and longitudinal openings 36, 37 for permitting passage of a light beam through the wedges. Each slide is provided with a rack 38, 39 adapted to be engaged by a pinion gear 40 mounted on a shaft 41. Slides 31, 32 and their associated optical wedges are moved with respect to each other along the selected line by rotating pinion 40 until the desired position is attained.

In order to maintain the spacing and angular orientation of the wedges with respect to each other during adjustment and use of the invention, slides 31, 32 are mounted in slide bases 42, 43 which are separated by spacer plates 44, 45, as shown in the perspective view of FIG. 4. Knob 46 is provided on shaft 41 which extends through a hole in spacer plate 45, to facilitate adjustment of the effective optical density of the attenuator.

Although the invention is described herein by reference to specific illustrative embodiment, many modifications and variations are possible and may be made by those skilled in the art to which it pertains, without departing from its scope and spirit.

What is claimed is:

1. A variable attenuator for a laser light beam comprising, in combination:
   a. first and second optical wedges each having a pair of plane parallel surfaces and each comprised of an optically flat transparent plate with one surface coated with a layer of evaporated metal, the density of the layer varying as a function of the distance from one end of the plate, the rate of increase of the function representing the optical density of the first wedge, being equal to the rate of decrease of the function representing the optical density of the second wedge;
   b. mechanical means for holding the wedges in spaced relationship to each other and for moving the wedges simultaneously in opposite directions along a direction having a component in a plane normal to the laser light beam; and,
   c. means defining a light beam path through the wedges, the parallel surfaces of the first wedge being inclined at a small angle of the order of one degree to the parallel surfaces of the second wedge to divert from the light beam path unwanted multiple reflections of the light beam occuring in the space between the wedges, whereby coherent laser light may be continuously attenuated with the sum of the functions representing the optical densities being constant over the cross section of the light beam path through the wedges for all working positions of the wedges with respect to each other.

* * * * *